United States Patent

[11] 3,576,360

[72] Inventor Yoshiyuki Shimizu
 Yokohama-shi, Japan
[21] Appl. No. 776,960
[22] Filed Nov. 19, 1968
[45] Patented Apr. 27, 1971
[73] Assignee Nippon Kogaku K. K.,
 Tokyo, Japan
[32] Priority Nov. 25, 1967
[33] Japan
[31] 42/75342

[54] WIDE ANGLE PHOTOGRAPHIC OBJECTIVE OF LARGE APERTURE RATIO
5 Claims, 12 Drawing Figs.

[52] U.S. Cl. .................................................... 350/176,
 350/214
[51] Int. Cl. ................................................... G02b 9/64,
 G02b 13/04
[50] Field of Search ....................................... 350/214,
 215, 176

[56] References Cited
UNITED STATES PATENTS
3,033,082  5/1962  Merigold ...................... 350/214
3,036,499  5/1962  Lautenbacher .............. 350/214
3,507,559  4/1970  Mori ............................ 350/214

OTHER REFERENCES
"Mitteilungen Der Industrie" Photographische Korrespondenz, Vol. 99, July 1963, pp. 105, 106. 350-214.

Primary Examiner—John K. Corbin
Attorney—Harry G. Shapiro

ABSTRACT: The present invention provides a compact wide angle camera lens system of large aperture ratio having long back focus comprising eight lens groups, by which the aperture ratio of F/1.4, angle of field 62° and longer back focus than the focal length of the whole system is obtained.

INVENTOR.
YOSHIYUKI SHIMIZU
BY
ATTORNEY

INVENTOR.
YOSHIYUKI SHIMIZU
BY Harry S. Shapiro
ATTORNEY

WIDE ANGLE PHOTOGRAPHIC OBJECTIVE OF LARGE APERTURE RATIO

This invention relates to a wide angle camera lens of large aperture ratio having long back focus.

A wide angle lens for single lens reflex camera with rotatable reflecting mirror built therein requires larger back focus than the focal length thereof. On the other hand, the focusing thereof can be carried out while directly observing the image of the object as is formed by the camera lens, and therefore bright finder is preferable. In the case of a wide angle lens, the field depth is deep and focusing is difficult, and therefore a camera lens of as large aperture ratio as possible is needed. However, there is a contradiction in view of the correction of aberrations whether long back focus or large aperture ratio is desired, and therefore there are a number of problems in the planning of such a lens as above, and the fastest wide angle lens for a single reflex camera has the aperture ratio of around F/2 at the best.

An inverted telephoto wide angle objective lens, in most cases, obtains a long back focus by providing the positive refractive power in the rear side thereof, and the negative refractive power on the front side thereof. In regard to the front side refractive power, when the absolute value thereof is larger, there is a grater likelihood that greater back focus may be obtained, however when it is made too large, the radius of curvature must be made smaller since there is a restriction to the number of lenses composing the refractive power. As a result, excessive positive spherical aberration and negative distortion are obtained, and in the case of a lens of large aperture ratio, the correction of these aberrations is difficult, and in particular, the correction of high order spherical aberration is very difficult. On the other hand, in regard to the negative refractive power, when the relative distance from the rear side positive refractive power is greater, in other words, when the lens group composing the negative refractive power positions nearer to the front, there is the likelihood that larger back focus will be obtained. As a result relatively smaller absolute value of the front side refractive power can be made sufficient for the purpose, and therefore, the correction of the respective aberrations can be easily accomplished. However, in the case of a wide angle lens, a large angle of field must be covered, and therefore it is impossible to avoid the effective diameter of the front side negative lens from becoming larger, and mechanical disadvantages such as the increase of capacity and weight of the lens system are necessitated, and at the same time, it is very inconvenient to carry around and not practical.

The object of this invention is to provide a wide angle lens of miniature type and light weight having longer back focus than the focal length, wherein the speed of the lens is F/1.4, and the angle of field is 62°, by taking into consideration the above mentioned points.

The gist of this invention resides in a wide angle camera lens of large aperture ratio having long back focus wherein the below given conditions are satisfied and either of the below given lenses $L_5$ or $L_6$ is made to be a cemented lens;

Conditions:
$1.5f < A l f L_1 < 4.5f$
$2f < -f L_2 < 5.5f$
$0.25f < d_2 + d_4 < 0.7f$
$0.5f < R_5 < 2f$
$n_3 - n_4 > f$
$R_6 < 0$ In the above given conditions, the focal length of the whole lens group is $f$, the focal lengths of the lenses $L_1$ and $L_2$ are respectively $fL_1$, $fL_2$; the radius of curvature of the lens $L_3$ on the side of the object is $R_5$; the refractive indexes of the glasses $L_3$ and $L_4$ are respectively $n_3$ and $n_4$, the radius of curvature of the cemented surface thereof is $R_6$, and the lens system comprises, as observed from the direction in which light is projected, two negative meniscus lenses $L_1$ and $L_2$ separated from each other with air space $d_2$ with the convex surfaces thereof being turned to the side of the object, a biconvex lens $L_3$ separated from said negative meniscus lens $L_2$ with the air space $d_4$, a lens $L_4$ cemented to the lens $L_3$, a biconcave lens $L_5$ separated from said negative meniscus lens $L_4$ with the air space $d_7$ inclusive of the stop, positive meniscus lens $L_6$ with the concave surface thereof being turned to the object as it is separated from said biconcave lens $L_5$ with the air space $d_9$, a positive lens $L_7$ separated from said positive meniscus lens $L_6$ with the air space $d_{11}$, and a positive lens $L_8$ separated from said positive lens $L_7$ with the air space $d_{13}$.

The constitution of lenses in accordance with this invention is of the so-called counter telescopic type, and when the respective component lenses are represented by L subscript, and the radii of curvature of lens surfaces are represented by R subscript, and when the thicknesses of lenses and air spaces are represented by $d$ subscript, and the refractive indexes of glass are represented by $n$ subscript, as is observed from the direction in which light is projected, the negative meniscus lenses $L_1$ and $L_2$ separated from each other with the air space $d_2$ are provided, and the negative refractive power on the front side is composed by said negative meniscus lenses to form back focus longer than the focal length of the whole lens group. By dividing the negative meniscus lens into two negative lenses $L_1$ and $L_2$ to divide the refractive power into said two negative lenses and the generation of the excessive positive spherical aberration can be prevented. When the focal lengths thereof are represented by $fL_1$ and $fL_2$, and the focal length of the whole lens group is represented by $f$, the following relation can be obtained.

$$1.5f < -fL_1 < 4.5f \qquad (1)$$
$$2f < -fL_2 < 5.5f$$

When the values of $fL_1$ and $fL_2$ become lower than said lower limit, the absolute value of the negative refractive power becomes too large, and excessively great positive spherical aberration, in particular high order disturbance of spherical aberration is generated, and the correction of the aberration becomes difficult, and on the other hand, when it goes beyond said upper limit, it is necessary to keep the value of the air space $d_4$ for separating the lens $L_2$ and $L_3$ large, and it becomes difficult to minimize the lens system. The reason why the upper and lower limits of $fL_2$ are larger than the upper and lower limits of $fL_1$ is that the lens $L_2$ receives the dispersed light flux having passed through the lens $L_1$, and therefore the effect given to the aberration is greater when compared with the refractive power, and the tendency can be known from the Seidel aberration coefficient. In regard to air space, the biconvex lens $L_3$ separated from the lens $L_2$ with the air space $d_4$ and the lens $L_4$ cemented to the lens $L_3$ are provided so that the composite focal length of the lenses $L_3$ and $L_4$ has the values of the positive.

When the value of $d_2 + d_4$, is greater there is a more possibility that longer back focus can be obtained, and the correction of aberration can be relatively easier, but as described before, it is impossible to make it excessively great, and it is the most appropriate to make it within the range as given below;

$$0.25f < d_2 + d_4 < 0.7f \qquad (2)$$

In order to obtain long focus by a value smaller than the lower limit, it is necessary to make small the absolute values of the focal length of the lenses $L_1$ and $L_2$, and as a result, the disturbance of the spherical aberration is generated, and it is impossible to obtain a lens of large aperture ratio.

When it goes beyond the upper limit, the effective apertures of the lenses $L_1$ and $L_2$ become greater because of the condition that wide angle must be covered, and it is not advantageous in view of the minimization of lens group. In other words, the formula (2) is a condition for making the lens group smaller, and thereby it is possible to control the effective aperture below $1.5f$.

In regard to the radius of curvature $R_5$ of the lens surface $L_3$ on the side of the object, when it is a lens of a large aperture, in order that the spherical aberration caused by the lenses $L_1$ and $L_2$, in particular, high order spherical aberration should be compensated and corrected, the following relation must be retained.

$$0.5f < R_5 < 2f \qquad (3)$$

When the value of $R_5$ becomes below the lower limit, it is difficult to obtain long back focus, while when it goes beyond the upper limit, excessively corrected spherical aberration caused by said lenses $L_1$ and $L_2$ is not compensated and no excellent correction can be obtained. In other words, the formula (3) is an indispensable condition for correcting the spherical aberration.

In addition, the following condition is given to the cemented surface $R_6$ between the lenses $L_3$ and $L_4$ and between the refractive indexes $n_3$ and $n_4$ of the lenses $L_3$ and $L_4$.

$$n_3 - n_4 > 0.1 \qquad (4)$$
$$R_6 < 0$$

The above given condition is an indispensable condition for correcting distortion. When light crossing across the light axis behind the cemented surface $R_6$ comes into the lens group, if the cemented surface $R_6$ directs the concave surface towards the side of the object, the angle of incidence becomes large, and great refraction is given to said surface in the relation of $n_3 - n > 0.1$, and in view of aberrations, the positive distortion is generated, and it is very effective for correcting the negative distortion generated by the lenses $L_1$ and $L_2$.

The biconcave lens $L_5$ is indispensable for obtaining the plainness of image, and the lens $L_6$ directs the concave surface thereof towards the side of the object, and therefore there is less possibility to produce the negative distortion relative to the degree of the positive refractive power, and at the same time there is an effect to much increase the back focus.

Either of the lenses $L_5$ and $L_6$ behind the stop is cemented and it is effective for excellently retaining the chromatic aberration. The lenses $L_7$ and $L_8$ are divided into two in order to retain excellent spherical aberration.

This invention will be described more clearly referring to the illustrative embodiments shown in the attached drawings in which.

EMBODIMENT 1

This is one of the embodiments of this invention, and in this embodiment $L_5$ is composed of two lenses cemented together, and the cemented surface has a concave surface which is directed towards the object.

Figure 1:
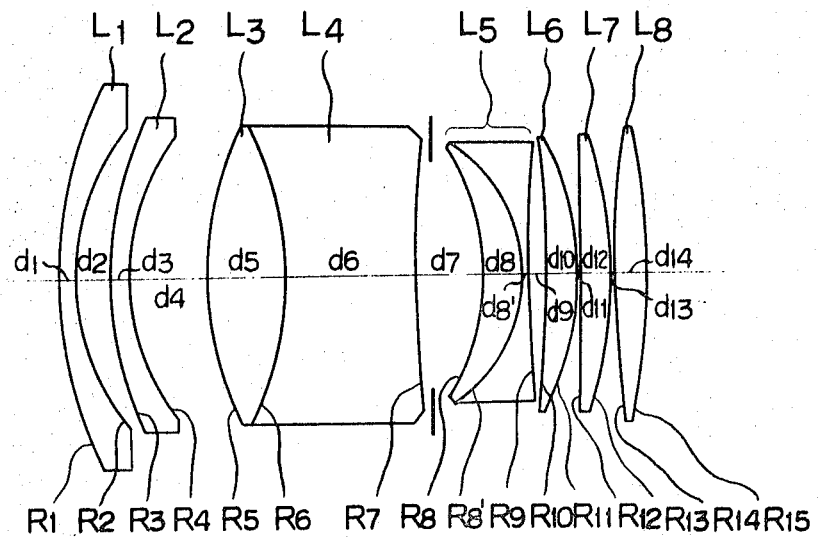
FIG. 1 is a cross section view of a camera lens of a first embodiment of this invention.

FIG. 1 shows the cross section view thereof. The details of the lens group when the aperture ratio F is 1.4 and the angle of field thereof is 62°, and the focal length $f$ is 100.00, and the back focus $S'$ is set to be 106.44, are as follows.

| Lens | Radius | Thickness and air spacing | Refractive index | Abbe number |
|---|---|---|---|---|
| $L_1$ | $R_1 = +129.722$ | $d_1 = 5.833$ | $n_1 = 1.56883$ | $vd_1 = 56.0$ |
|  | $R_2 = +71.111$ | $d_2 = 12.222$ |  |  |
| $L_2$ | $R_3 = +138.889$ | $d_3 = 5.833$ | $n_2 = 1.54814$ | $vd_2 = 45.9$ |
|  | $R_4 = +73.333$ | $d_4 = 24.444$ |  |  |
| $L_3$ | $R_5 = +107.778$ | $d_5 = 23.611$ | $n_3 = 1.80411$ | $vd_3 = 46.4$ |
| $L_4$ | $R_6 = -116.667$ | $d_6 = 44.444$ | $n_4 = 1.50137$ | $vd_4 = 56.5$ |
|  | $R_7 = +432.031$ | $d_7 = 22.222$ |  |  |
| $L_5$ | $R_8 = -74.194$ | $d_8 = 12.222$ ⎫ | $n_5 = 1.80411$ | $vd_5 = 46.4$ |
|  | $R_{8'} = -52.778$ | $d_{8'} = 2.778$ ⎬ 15.000 | $n_{5'} = 1.78470$ | $vd_{5'} = 26.1$ |
|  | $R_9 = +515.056$ | $d_9 = 4.722$ ⎭ |  |  |

Table — Continued

| Lens | Radius | Thickness and air spacing | Refractive index | Abbe number |
|---|---|---|---|---|
| $L_6$ | $R_{10} = -314.667$ | $d_{10} = 11.111$ | $n_6 = 1.77250$ | $vd_6 = 49.5$ |
|  | $R_{11} = -87.500$ | $d_{11} = 0.139$ |  |  |
| $L_7$ | $R_{12} = -2777.778$ | $d_{12} = 10.556$ | $n_7 = 1.77250$ | $vd_7 = 49.5$ |
|  | $R_{13} = -151.250$ | $d_{13} = 0.139$ |  |  |
| $L_8$ | $R_{14} = +291.669$ | $d_{14} = 9.444$ | $n_8 = 1.71300$ | $vd_8 = 53.9$ |
|  | $R_{15} = -304.097$ |  |  |  |

(In the above table, R is the radius of curvature; d is the thickness of the lens and air space, n is the refractive index of the glass; v is Abbe's number)

Figure 4A:
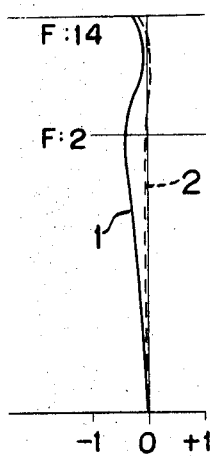
FIGS. 4A, 4B and 4C are aberration curves with regard to the embodiment of the invention illustrated in FIG. 1.
Figure 4B:
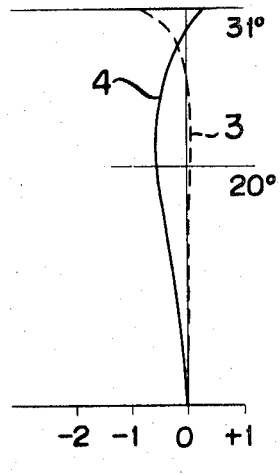
Figure 4C:
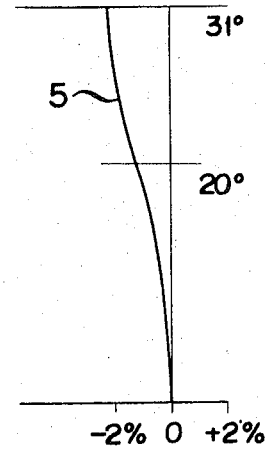

FIG. 4 is a diagram showing the aberration curve, and in the diagram (A) the spherical aberration 1 and the sine condition 2 are shown and in (B), the meridional image 3 and the sagittal image 4 are shown and (C) show the distortion 5.

The seidel aberration coefficients of the respective refractive surfaces are as follows.

In the following table, I is the spherical aberration; II is coma; III is the curve of meridional image; IV is the curve of sagittal image; V is distortion; and $\Sigma$ is the sum of the respective coefficients.

$f = 1.0$

| Lens | I | II | III | IV | V |
|---|---|---|---|---|---|
| $R_1$ | 0.105874 | 0.055521 | 0.366854 | 0.308623 | 0.161844 |
| $R_2$ | −1.553243 | 0.229848 | −0.611921 | −0.543895 | 0.080485 |
| $R_3$ | 0.451356 | 0.127379 | 0.362770 | 0.290874 | 0.082089 |
| $R_4$ | −3.325389 | 0.380211 | −0.613231 | −0.526288 | 0.060173 |
| $R_5$ | 3.635927 | 0.243248 | 0.472014 | 0.433034 | 0.034696 |
| $R_6$ | 0.751088 | −0.534800 | 1.238186 | 0.476596 | −0.339352 |
| $R_7$ | 0.002717 | −0.020192 | 0.372915 | 0.072775 | −0.540870 |
| $R_8$ | −1.464915 | 0.665053 | −1.506877 | −0.903026 | 0.409963 |
| $R_{8'}$ | 0.051920 | −0.005679 | 0.013286 | 0.012043 | −0.001317 |
| $R_9$ | −0.540703 | −0.708070 | −2.867098 | −1.012610 | −1.326050 |
| $R_{10}$ | 0.090772 | 0.226700 | 1.560020 | 0.427671 | 1.068094 |
| $R_{11}$ | 0.434319 | −0.164108 | 0.684112 | 0.560094 | −0.211633 |
| $R_{12}$ | +0.000007 | 0.000425 | +0.060643 | 0.009755 | 0.584575 |
| $R_{13}$ | 0.822959 | −0.263123 | 0.540533 | 0.372277 | −0.119027 |
| $R_{14}$ | −0.002502 | 0.021445 | −0.408724 | −0.041104 | 0.352320 |
| $R_{15}$ | 1.442846 | −0.319861 | 0.349601 | 0.207783 | −0.046063 |
| $\Sigma$ | 0.303033 | −0.066003 | 0.013083 | 0.144602 | 0.249927 |

EMBODIMENT 2

Figure 2:
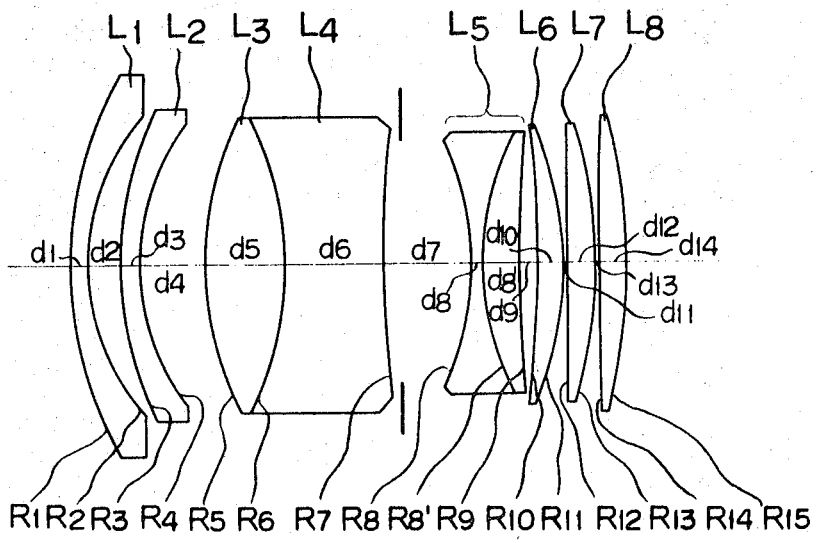
FIG. 2 is a cross section view of a camera lens of a second embodiment.

This is the second embodiment of this invention; and the lens $L_5$ is composed of two lenses cemented together, and the convex surface of the cemented surface thereof is directed towards the side of the object. FIG. 2 shows the cross section view thereof. The details of the lens group when the aperture ratio F is 1.4, the angle of field is set to be 62°, and the focal length $f$ is set to be 100.00, and the back focus is set to be $S' = 106.67$.

| Lens | Radius | Thickness and air spacing | Refractive index | Abbe number |
|---|---|---|---|---|
| $L_1$ | $R_1 = +123.525$ | $d_1 = 5.556$ | $n_1 = 1.56384$ | $vd_1 = 60.8$ |
|  | $R_2 = +67.722$ | $d_2 = 11.667$ |  |  |
| $L_2$ | $R_3 = +123.525$ | $d_3 = 5.556$ | $n_2 = 1.55823$ | $vd_2 = 67.7$ |
|  | $R_4 = +69.778$ | $d_4 = 22.222$ |  |  |
| $L_3$ | $R_5 = +108.333$ | $d_5 = 23.611$ | $n_3 = 1.80411$ | $vd_3 = 46.4$ |
| $L_4$ | $R_6 = -105.167$ | $d_6 = 34.722$ | $n_4 = 1.51178$ | $vd_4 = 50.9$ |
|  | $R_7 = +333.333$ | $d_7 = 28.889$ |  |  |
| $L_5$ | $R_8 = -83.333$ | $d_8 = 3.889$ ⎫ | $n_5 = 1.78470$ | $vd_5 = 26.1$ |
|  | $R_{8'} = +91.667$ | $d_{8'} = 11.111$ ⎬ 15.000 | $n_{5'} = 1.80411$ | $vd_{5'} = 46.4$ |
|  | $R_9 = +361.111$ | $d_9 = 5.000$ ⎭ |  |  |
| $L_6$ | $R_{10} = -389.028$ | $d_{10} = 9.444$ | $n_6 = 1.76684$ | $vd_6 = 46.2$ |
|  | $R_{11} = -94.444$ | $d_{11} = 0.278$ |  |  |
| $L_7$ | $R_{12} = +1864.453$ | $d_{12} = 9.444$ | $n_7 = 1.74443$ | $vd_7 = 49.4$ |
|  | $R_{13} = -154.078$ | $d_{13} = 0.278$ |  |  |

Table—Continued

| Lens | Radius | Thickness and air spacing | Refractive index | Abbe number |
|---|---|---|---|---|
| $L_8$ | $R_{14}=+472.222$ $R_{15}=-226.909$ | $d_{14}=8.333$ | $n_8=1.74443$ | $vd_8=49.4$ |

In the above given table R is the radius of curvature; $d$ is the thickness of lens and air space; $n$ is the refractive index of the glass; $Vd$ is Abbe number of the glass in helium $d$-line.

Figure 5A:
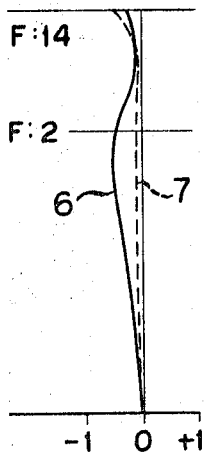
FIGS. 5A, 5B and 5C are aberration curves with regard to the embodiment of the invention illustrated in FIG. 2.
Figure 5B:
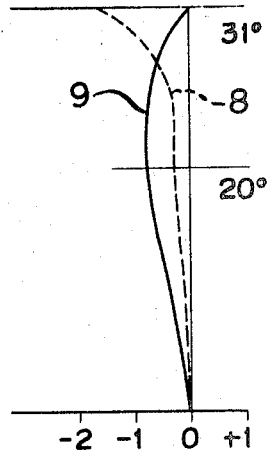
Figure 5C:
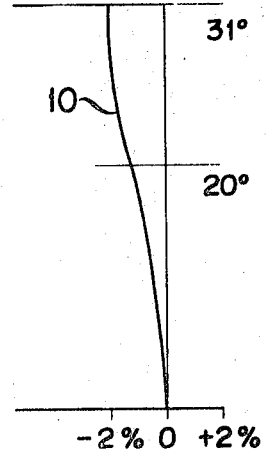

FIG. 5 is a table showing aberrations and in the table, A shows the spherical aberration 6 and the sinusoidal conditions 7, B shows the meridional image 8 and the sagittal image 9, and C shows the distortion 10.

The seidel aberration coefficients of the respective refractive surfaces are as follows. In the following table, I is the spherical aberration; II is coma; III is the curve of meridional image; IV is the curve of sagittal image, V is distortion; and $\Sigma$ shows the sum of the respective coefficients.

$f=1.0$

| Lens | I | II | III | IV | V |
|---|---|---|---|---|---|
| $R_1$ | 0.122323 | 0.061585 | 0.384902 | 0.322889 | 0.162564 |
| $R_2$ | -1.780856 | 0.241726 | -0.630843 | -0.565221 | 0.076721 |
| $R_3$ | 0.590703 | 0.139758 | 0.389218 | 0.323086 | 0.076441 |
| $R_4$ | -3.693771 | 0.361804 | -0.619724 | -0.548847 | 0.053759 |
| $R_5$ | 2.959337 | 0.313226 | 0.510885 | 0.444579 | 0.047056 |
| $R_6$ | 0.873440 | -0.582742 | 1.268549 | 0.490960 | -0.327559 |
| $R_7$ | 0.000007 | -0.000855 | 0.215750 | 0.004263 | -0.526992 |
| $R_8$ | -1.042598 | 0.522881 | -1.314322 | -0.789854 | 0.396126 |
| $R_8'$ | 0.059990 | 0.039090 | 0.082991 | 0.032048 | 0.020883 |
| $R_9$ | -0.685942 | -0.848632 | -3.274642 | -1.173832 | -1.452583 |
| $R_{10}$ | 0.127577 | 0.282444 | 1.764350 | 0.513740 | 1.137372 |
| $R_{11}$ | 0.270485 | -0.126715 | 0.637639 | 0.518913 | -0.243097 |
| $R_{12}$ | 0.002122 | 0.013256 | 0.271279 | 0.105685 | 0.660090 |
| $R_{13}$ | 0.769727 | -0.251526 | 0.523544 | 0.349160 | -0.117364 |
| $R_{14}$ | -0.017341 | 0.056905 | -0.469844 | -0.096368 | 0.316238 |
| $R_{15}$ | 1.810332 | -0.284051 | 0.321777 | 0.232639 | -0.036502 |
| $\Sigma$ | 0.365535 | -0.062046 | 0.061509 | 0.173840 | 0.243153 |

EMBODIMENT 3

Figure 3:
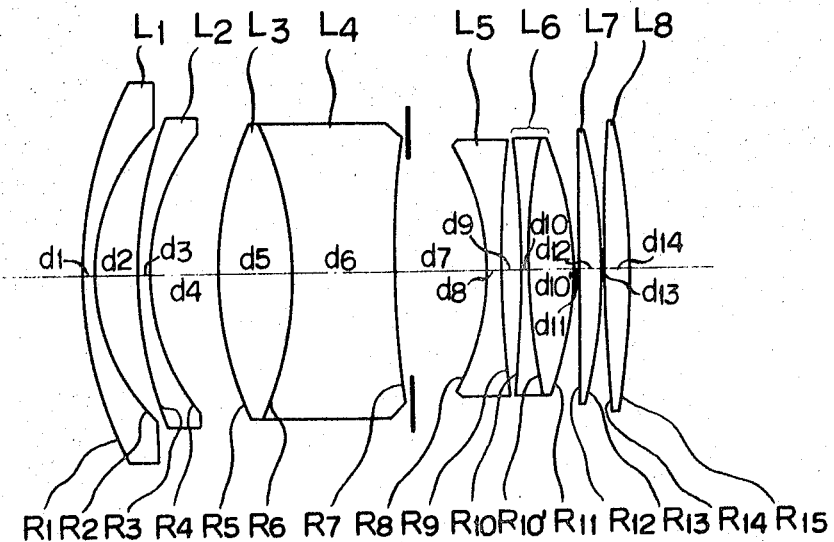
FIG. 3 is a cross section view of a camera lens of a third embodiment.

This is third embodiment of this invention, wherein the lens $L_6$ is composed of two lenses cemented together. FIG. 3 shows the cross-sectional view thereof. The details of the lens group when the aperture ratio F is set to be 1.4 the angle of field is 62°, the focal length $f$ is 100.00, and the back focus $S'$ is set to be 107.77.

| Lens | Radius | Thickness and air spacing | Refractive index | Abbe number |
|---|---|---|---|---|
| $L_1$ | $R_1=+123.611$ $R_2=+67.722$ | $d_1=5.556$ | $n_1=1.56883$ | $vd_1=56.0$ |
| | | $d_2=11.667$ | | |
| $L_2$ | $R_3=+123.611$ $R_4=+69.778$ | $d_3=5.556$ | $n_2=1.54814$ | $vd_2=45.9$ |
| | | $d_4=22.222$ | | |
| $L_3$ | $R_5=+108.333$ $R_6=-106.944$ | $d_5=23.611$ | $n_3=1.80411$ | $vd_3=46.4$ |
| $L_4$ | $R_7=+333.33$ | $d_6=34.722$ | $n_4=1.50137$ | $vd_4=56.5$ |
| | | $d_7=28.889$ | | |
| $L_5$ | $R_8=-83.889$ $R_9=+388.889$ | $d_8=7.778$ | $n_5=1.78470$ | $vd_5=26.1$ |
| | | $d_9=5.000$ | | |
| $L_6$ | $R_{10}=-361.111$ $R_{10}'=+166.667$ $R_{11}=-93.056$ | $d_{10}=2.778$ $d_{10}'=15.000$ } 17.778 | $n_6=1.78470$ $n_6'=1.76684$ | $vd_6=26.1$ $vd_6'=46.2$ |
| | | $d_{11}=0.278$ | | |
| $L_7$ | $R_{12}=+1861.111$ $R_{13}=-154.167$ | $d_{12}=9.444$ | $n_7=1.74443$ | $vd_7=49.4$ |
| | | $d_{13}=0.278$ | | |
| $L_8$ | $R_{14}=+444.444$ $R_{15}=-267.586$ | $d_{14}=8.333$ | $n_8=1.74443$ | $vd_8=49.4$ |

(In the above given table, R is radius of curvature; $d$ is the thickness of lens and the air space; $n$ is the refractive index of the glass; $Vd$ is Abbe number of the glass in helium $d$-line.)

Figure 6A:
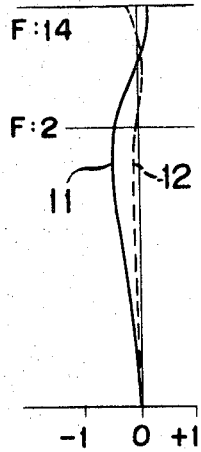
FIGS. 6A, 6B and 6C are aberration curves with regard to the embodiment of the invention illustrated in FIG. 3.
Figure 6B:
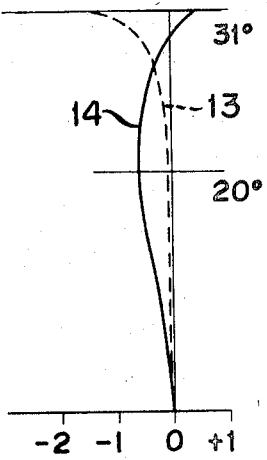
Figure 6C:
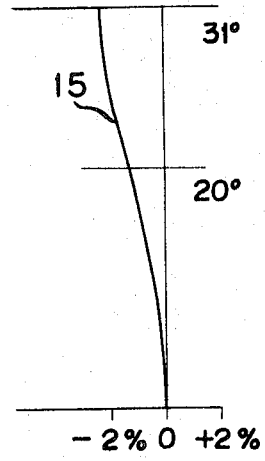

FIG. 6 is a diagram showing aberration curves of the third embodiment 3, and in A the spherical aberration 11 and the sinusoidal condition 12 are shown B shows meridional image 13 and sagittal image 14, and C shows the distortion 15.

The seidel aberration coefficients of the respective refractions of this embodiment are given in the following table.

In the following table, I is the spherical aberration, II is coma, III is the curve of meridional image, IV is the curve of sagittal image; V shows distortion, $\Sigma$ is the sum of the respective coefficients of the respective surfaces.

$f=1.0$

| Lens | I | II | III | IV | V |
|---|---|---|---|---|---|
| $R_1$ | 0.122336 | 0.061429 | 0.385698 | 0.324007 | 0.162695 |
| $R_2$ | -1.797644 | 0.249701 | -0.639152 | -0.569783 | 0.079145 |
| $R_3$ | 0.591855 | 0.137398 | 0.382122 | 0.318330 | 0.073899 |
| $R_4$ | -3.657465 | 0.365964 | -0.617269 | -0.544032 | 0.054436 |
| $R_5$ | 2.944963 | 0.306733 | 0.507270 | 0.443374 | 0.046180 |
| $R_6$ | 0.876879 | -0.592192 | 1.304305 | 0.504442 | -0.340670 |
| $R_7$ | 0.000048 | -0.002312 | 0.233185 | 0.010940 | -0.525905 |
| $R_8$ | -1.039616 | 0.525656 | -1.321477 | -0.789908 | 0.399397 |
| $R_9$ | -0.565490 | -0.725076 | -2.902148 | -1.042755 | -1.337027 |
| $R_{10}$ | 0.100484 | 0.241650 | 1.621648 | 0.459377 | 1.104741 |
| $R_{10'}$ | -0.042887 | -0.034056 | -0.084527 | -0.030441 | -0.024173 |
| $R_{11}$ | 0.348601 | -0.139678 | 0.634283 | 0.522351 | -0.209296 |
| $R_{12}$ | 0.001074 | 0.008035 | 0.203337 | 0.083066 | 0.621658 |
| $R_{13}$ | 0.885689 | -0.250629 | 0.489568 | 0.347725 | -0.098398 |
| $R_{14}$ | -0.022018 | 0.065190 | -0.483027 | -0.096996 | 0.287188 |
| $R_{15}$ | 1.796792 | -0.273703 | 0.295819 | 0.212433 | -0.032360 |
| $\Sigma$ | 0.543601 | -0.055891 | 0.009635 | 0.152130 | 0.261510 |

As mentioned above, in accordance with this invention, the first, second and third embodiments have the back focus S' longer than the focal length inspite of the fact that the present invention is of the wide angle lens having a large aperture ratio, and inspite of extreme asymmetrical optical system, the respective seidel sums of the three embodiments are excellent, and in particular the coma of the three embodiments are small. When the actual aberrations should be observed, the correction of the aberration is excellent.

I claim:

1. A wide angle photographic objective of large aperture ratio having long back focus consisting of, as observed from the direction in which light is projected, a first negative meniscus single lens ($L_1$), a second negative meniscus single lens ($L_2$), said first and second negative meniscus lenses being separated by an air space and having their convex surfaces toward an object, a third biconvex lens ($L_3$) separated from said second lens by an air space, a fourth biconcave lens ($L_4$) cemented to said third lens, the composite power of said third and fourth lenses being positive, a fifth biconcave lens component ($L_5$) separated from said fourth lens by an air space, a sixth positive meniscus lens ($L_6$) separated from said fifth lens component and having an outer surface which is concave toward the object, said fifth lens component being a doublet which includes a biconcave lens element cemented to a positive meniscus, a seventh positive single lens ($L_7$) separated from said sixth lens by an air space, and an eighth positive single lens ($L_8$) slightly separated from said seventh lens, the respective rear surfaces of said seventh and eighth lenses being concave toward the object.

2. A wide photographic objective according to claim 1, of which the detailed data is as follows:

Aperture ratio F:1.4
Angle of field 62°
Focal length $f=100.00$
Back focus $s'=106.44$

| Lens | Radius of curvature | Thickness and air spacing | Refractive index | Abbe number |
|---|---|---|---|---|
| $L_1$ | $R_1=+129.722$ $R_2=+71.111$ | $d_1=5.833$ | $n_1=1.56883$ | $vd_1=56.0$ |
| | | $d_2=12.222$ | | |
| $L_2$ | $R_3=+138.889$ $R_4=+73.333$ | $d_3=5.833$ | $n_2=1.54814$ | $vd_2=45.9$ |
| | | $d_4=24.444$ | | |
| $L_3$ | $R_5=+107.778$ $R_6=-116.667$ | $d_5=23.611$ | $n_3=1.80411$ | $vd_3=46.4$ |
| $L_4$ | $R_7=+432.031$ | $d_6=44.444$ | $n_4=1.50137$ | $vd_4=56.5$ |
| | | $d_7=22.222$ | | |

Table—Continued

| Lens | Radius of curvature | Thickness and air spacing | Refractive index | Abbe number |
|---|---|---|---|---|
| $L_5$ | $R_8=-74.194$<br>$R_8'=-52.778$<br>$R_9=+515.056$ | $d_8=12.222$<br>$d_8'=2.778$ } 15.000<br>$d_9=4.722$ | $n_5=1.80411$<br>$n_5'=1.78470$ | $vd_5=46.4$<br>$vd_5'=26.1$ |
| $L_6$ | $R_{10}=-314.667$<br>$R_{11}=-87.500$ | $d_{10}=11.111$<br>$d_{11}=0.139$ | $n_6=1.77250$ | $vd_6=49.5$ |
| $L_7$ | $R_{12}=-2777.778$<br>$R_{13}=-151.250$ | $d_{12}=10.556$<br>$d_{13}=0.139$ | $n_7=1.77250$ | $vd_7=49.5$ |
| $L_8$ | $R_{14}=+291.669$<br>$R_{15}=-304.097$ | $d_{14}=9.444$ | $n_8=1.71300$ | $vd_8=53.9$ |

3. A wide angle photographic objective according to claim 1, of which the detailed data is as follows:
Aperture ratio F:1.4
Angle of field 62°
Focal Length $f=100.00$
Back focus $s'=106.67$

| Lens | Radius of curvature | Thickness and air spacing | Refractive index | Abbe number |
|---|---|---|---|---|
| $L_1$ | $R_1=+123.525$<br>$R_2=+67.722$ | $d_1=5.556$<br>$d_2=11.667$ | $n_1=1.56384$ | $vd_1=60.8$ |
| $L_2$ | $R_3=+123.525$<br>$R_4=+69.778$ | $d_3=5.556$<br>$d_4=22.222$ | $n_2=1.55823$ | $vd_2=67.7$ |
| $L_3$ | $R_5=+108.333$ | $d_5=23.611$ | $n_3=1.80411$ | $vd_3=46.4$ |
| $L_4$ | $R_6=-105.167$<br>$R_7=-333.333$ | $d_6=34.722$<br>$d_7=28.889$ | $n_4=1.51118$ | $vd_4=50.9$ |
| $L_5$ | $R_8=-83.333$<br>$R_8'=+91.667$<br>$R_9=+361.111$ | $d_8=3.889$<br>$d_8'=11.111$ } 15.000<br>$d_9=5.000$ | $n_5=1.78470$<br>$n_5'=1.80411$ | $vd_5=26.1$<br>$vd_5'$ 46.4 |
| $L_6$ | $R_{10}=-389.028$<br>$R_{11}=-94.444$ | $d_{10}=9.444$<br>$d_{11}=0.278$ | $n_6=1.76684$ | $vd_6=46.2$ |
| $L_7$ | $R_{12}=+1864.453$<br>$R_{13}=-154.078$ | $d_{12}=9.444$<br>$d_{13}=0.278$ | $n_7=1.74443$ | $vd_7=49.4$ |
| $L_8$ | $R_{14}=+472.222$<br>$R_{15}=-226.909$ | $d_{14}=8.333$ | $n_8=1.74443$ | $vd_8=49.4$ |

4. A wide angle photographic objective of large aperture ratio having long back focus consisting of, as observed from the direction in which light is projected, a first negative meniscus single lens($L_1$), a second negative meniscus single lens ($L_2$), said first and second negative meniscus lenses being separated by an air space and having their convex surfaces toward an object, a third biconvex lens ($L_3$) separated from said second lens by an air space, a fourth biconcave lens ($L_4$) cemented to said third lens, the composite power of said third and fourth lenses being positive, a fifth biconcave lens ($L_5$ separated from said fourth lens by an air space, a sixth positive meniscus lens component ($L_6$) separated from said fifth lens and having an outer surface which is concave toward the object, said sixth lens component being a doublet which includes a biconcave lens element cemented to a biconvex lens element, a seventh positive single lens ($L_7$) separated from said sixth lens by an air space, and an eighth positive single lens ($L_8$) slightly separated from said seventh lens, the respective rear surfaces of said seventh and eighth lenses being concave toward the object.

5. A wide angle photographic objective according to claim 1, of which the detailed data is as follows:

Aperture ratio $f:1.4$
Angle of field 62°
Focal length $f=100.00$
Back focus $s'=107.77$

| Lens | Radius of curvature | Thickness and air spacing | Refractive index | Abbe number |
|---|---|---|---|---|
| $L_1$ | $R_1=+123.611$<br>$R_2=+67.722$ | $d_1=5.556$<br>$d_2=11.667$ | $n_1=1.56883$ | $vd_1=56.0$ |
| $L_2$ | $R_3=+123.611$<br>$R_4=+69.778$ | $d_3=5.556$<br>$d_4=22.222$ | $n_2=1.54814$ | $vd_2=45.9$ |
| $L_3$ | $R_5=+108.333$ | $d_5=23.611$ | $n_3=1.80411$ | $vd_3=46.4$ |
| $L_4$ | $R_6=-106.944$<br>$R_7=+333.33$ | $d_6=34.722$<br>$d_7=28.889$ | $n_4=1.50137$ | $vd_4=56.5$ |
| $L_5$ | $R_8=-83.889$<br>$R_9=+388.889$ | $d_8=7.778$<br>$d_9=5.000$ | $n_5=1.78470$ | $vd_5=26.1$ |
| $L_6$ | $R_{10}=-361.111$<br>$R_{10}'=+166.667$<br>$R_{11}=-93.056$ | $d_{10}=2.778$<br>$d_{10}'=15.000$ } 17.778<br>$d_{11}=0.278$ | $n_6=1.78470$<br>$n_6'=1.76684$ | $vd_6=26.1$<br>$vd_6'=46.2$ |
| $L_7$ | $R_{12}=+1861.111$<br>$R_{13}=-154.167$ | $d_{12}=9.444$<br>$d_{13}=0.278$ | $n_7=1.74443$ | $vd_7=49.4$ |
| $L_8$ | $R_{14}=+444.444$<br>$R_{15}=-267.586$ | $d_{14}=8.333$ | $n_8=1.74443$ | $vd_8=49.4$ |

UNITED STATES PATENT OFFICE
CERTIFICATE OF CORRECTION

Patent No. 3,576,360     Dated    April 27, 1971

Inventor(s) Yoshiyuki Shimizu

It is certified that error appears in the above-identified patent and that said Letters Patent are hereby corrected as shown below:

Column 8, line 20, "1" should read --4--.

Signed and sealed this 18th day of April 1972.

(SEAL)
Attest:

EDWARD M. FLETCHER, JR.
Attesting Officer

ROBERT GOTTSCHALK
Commissioner of Paten